United States Patent [19]
Buck

[11] 3,875,471
[45] Apr. 1, 1975

[54] PHOTOFLASH SOURCE CONTROL CIRCUIT

[75] Inventor: Robert J. Buck, Dover, N.J.

[73] Assignee: Berkey Photo, Inc., Paramus, N.J.

[22] Filed: Jan. 18, 1974

[21] Appl. No.: 434,839

[52] U.S. Cl. .............. 315/151, 315/149 P, 315/157
[51] Int. Cl. .......................................... H05b 41/36
[58] Field of Search ................ 315/107, 149 P, 157; 250/204, 205

[56] References Cited
UNITED STATES PATENTS
3,033,988  5/1962  Edgerton ........................ 315/151 X
3,612,947  10/1971  Pennewitz ........................ 315/151

*Primary Examiner*—Nathan Kaufman
*Attorney, Agent, or Firm*—Neuman, Williams, Anderson & Olson

[57] ABSTRACT

Circuits for controlling the amount of light received from a subject being photographed and terminating the operation of a flash lamp are disclosed. The circuits include a photosensitive element producing a signal related to the light received from the subject and a signal generator producing a signal having a predetermined function of time. The two signals are combined and when they achieve a predetermined relationship, the operation of the flash lamp is terminated.

7 Claims, 4 Drawing Figures

3,875,471

PHOTOFLASH SOURCE CONTROL CIRCUIT

BACKGROUND OF THE INVENTION

This invention relates to circuitry for controlling the operation of flash sources and, in particular, relates to circuitry for automatically terminating the operation of a photoflash lamp when a predetermined amount of light has been received from the subject being photographed.

Circuits for automatically controlling and terminating the operation of light flash sources are well known in the art. Such circuits have found particular application in the photographic fields where they are used to control the period of time for which a photoflash lamp is operative. Photoflash lamp controlling circuits generally include a photosensitive element physically located close to its associated camera and are operative to initiate operation of the photoflash lamp when the camera shutter is opened and terminate operation of the photoflash lamp when a desired total amount of light from the subject has been received by the photosensitive device. The photoflash controlling circuits of the prior art have, for the most part, used some sort of integrating technique to derive an electrical signal representative of the total light received by the photosensitive device over the time period of interest. In some cases the integration technique has been based on the properties of the photosensitive device itself, while in other cases the integration technique has used a separate element, commonly a capacitor, to integrate an electrical signal produced by the photosensitive device. Examples of the first mentioned technique appear in U.S. Pat. Nos. 3,350,603 and 3,350,604, both of which issued on Oct. 31, 1967, showing R. D. Erickson as the inventor, and Re. 26,999 which issued on Dec. 8, 1970, showing F. P. Elliott as the inventor, and examples of the second mentioned technique appear in U.S. Pat. Nos. 3,033,988, which issued on May 8, 1962, showing H. E. Edgerton as the inventor, 3,519,879, which issued on July 7, 1970, showing F. T. Ogawa as the inventor, and 3,517,255, which issued on June 23, 1970, showing J. B. Hoffer et al., as the inventors.

The photoflash controlling circuits of the prior art have had a number of disadvantages associated therewith. In many cases, they have not provided control which was sufficiently accurate over a broad range of distance between the camera and subject. The circuits of the prior art, for example, have been particularly noted for their inability to provide the desired control action at relatively short camera to subject distances. The circuits of the prior art have often not been sufficiently flexible in use in that any one circuit could not be used with different flash tubes having a wide variety of ignition and brightness characteristics. Moreover, many of the prior art circuits could not easily be altered to operate with films having different characteristics or with different camera exposure control settings. Also, many of the prior art circuits included an external switching means, usually part of the associated camera, to initiate the flash tube operation, but an excessively high and unsafe voltage was placed across the switching means.

SUMMARY OF THE INVENTION

There are provided by this invention flash source control circuits comprising a light sensitive element producing a first signal responsive to the light generated by the flash source, a signal generator producing a second signal which varies with time in a predetermined manner and independently of the light generated by the flash source, and apparatus for terminating the operation of the flash source when the first and second signals are in a predetermined relationship.

It is, therefore, an object of this invention to provide flash source control circuits which are capable of giving the desired control action over a wide variety of conditions.

It is an object of this invention to provide photoflash control circuits which are operable over a relatively wide range of distances from subject to camera and, in particular, which are operable at relatively short distances from subject to camera.

It is an object of this invention to provide photoflash control circuits which are operable with flash tubes having a wide variety of ignition and brightness characteristics.

It is an object of this invention to provide photoflash control circuits which may be operated with films having a wide variety of characteristics.

It is an object of this invention to provide photoflash control circuits which may be operated with a variety of camera exposure settings.

It is an object of this invention to provide photoflash control circuits which do not require the switching of relatively high voltages to initiate operation of the flash tubes.

It is an object of this invention to provide photoflash control circuits which are characterized by simplicity of design, economy of construction, versatility of use, and ease of operation.

Further and additional objects of this invention will appear from this specification, the claims appended hereto, and the accompanying drawing.

DESCRIPTION OF THE PREFERRED EMBODIMENTS

The invention will be described with reference to particular photoflash control circuits. As will be apparent to those skilled in the art, the invention has many applications other than those specifically described herein.

Figure 1:
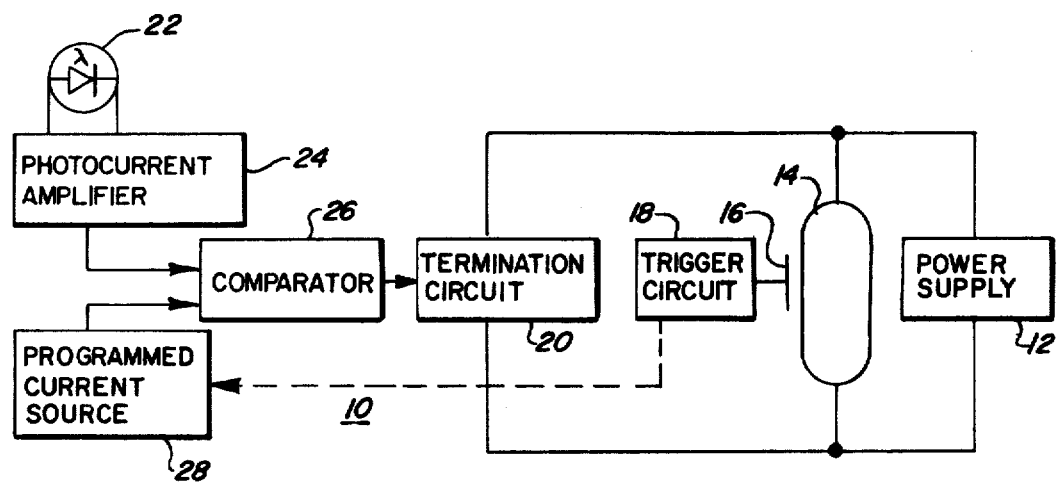
FIG. 1 is a block diagram disclosing a photoflash control circuit of this invention.

There is disclosed in FIG. 1 a photoflash circuit 10 including a control circuit of this invention. Circuit 10 is operated in conjunction with a camera to provide a controlled amount of light for the purpose of taking a photograph. Circuit 10 includes a power supply 12 for generating a relatively high d.c. voltage to operate a photoflash tube 14 connected thereacross. A trigger electrode 16 is located in close physical proximity with the photoflash tube 14. A trigger circuit 18 is electrically coupled to trigger electrode 16 and applies an electrical pulse to that electrode when it is desired to commence the operation of the photoflash tube 14 and cause it to emit light. There is also provided a termination circuit 20 which is coupled across photoflash tube 14. Termination circuit 20, when actuated, rapidly reduces the voltage appearing across the terminals of flash tube 14 to a value below that required to sustain ignition, thus terminating the operation of photoflash tube 14. The circuit as thus far described is well known in the prior art.

Circuit 10 also includes a photosensitive device 22 physically disposed to receive light from the subject being photographed. It is advantageously located in relatively close proximity to the camera with which the circuit is used. The photosensitive device generates an output current which is related to intensity or brightness of the light falling on it and, thus, to the intensity or brightness of the light from the subject being received by the camera. The output current of photosensitive device 22 is amplified by a current amplifier 24. The output of amplifier 24 is applied to a first input of a comparator 26. A programmed current source 28 is also provided which generates at an output an electric current which varies in magnitude as a function of time in a predetermined manner. The magnitude of the programmed current is initially a relatively high value and decreases to a relatively low value. The magnitude of the output of programmed current source 28 is independent of the light incident on photosensitive device 22. A connection between trigger circuit 18 and programmed current source 28, shown with a dashed line in FIG. 1, insures that the programmed current starts to vary in the desired manner at approximately the same time photoflash tube 14 is triggered. A source of power, not shown, must also be supplied to energize trigger circuit 18, termination circuit 20, amplifier 24, comparator 26, and programmed current source 28.

Figure 2:
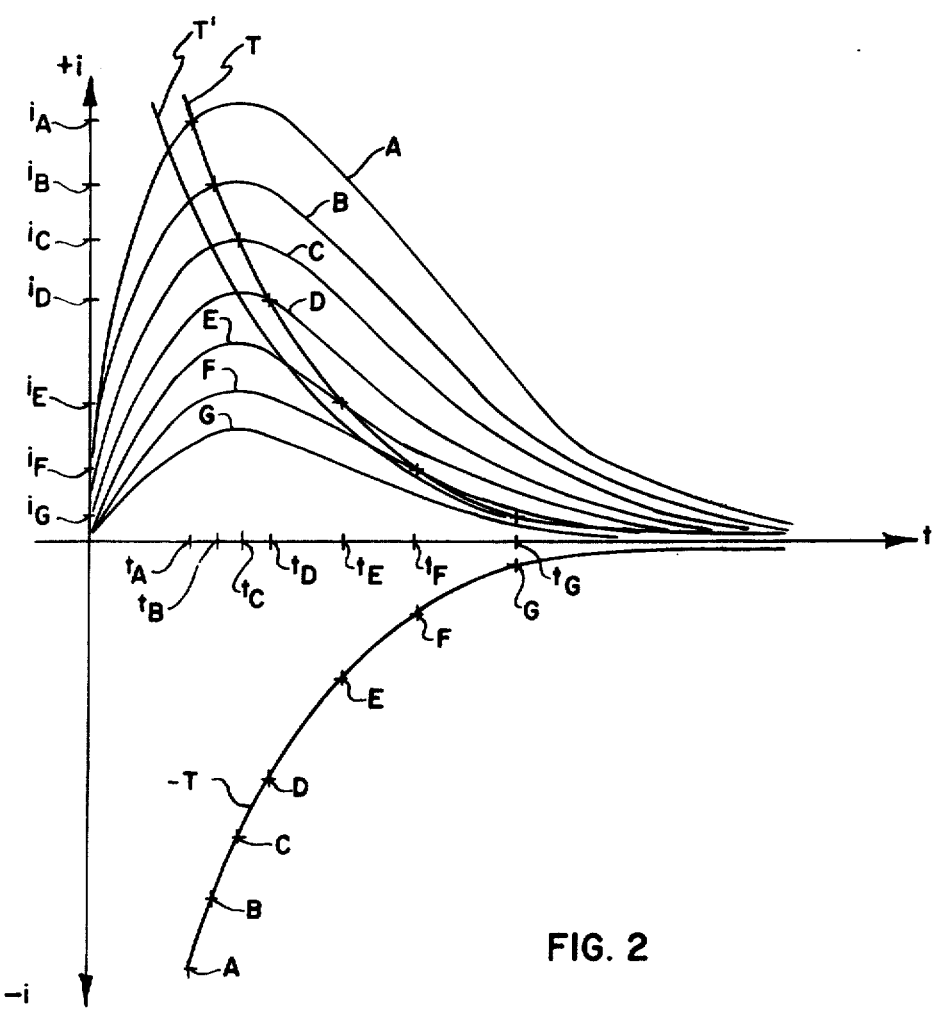
FIG. 2 is a set of curves useful in explaining the operation of the circuit of FIG. 1.

The operation of the circuit 10 of FIG. 1 will now be explained with reference to FIG. 2. There is shown in the upper half of FIG. 2 a plurality of curves labeled A–G each plotting current, $i$, versus time, $t$. Each curve represents the output of amplifier 24 corresponding to a different level of brightness of the light reflected from a subject being photographed and illuminated by a photoflash tube. For example, curves A–G of FIG. 1 can be considered as representing the current output of current amplifier 24 for the same subject at seven different distances from photosensitive device 22, the curve A representing the output for the smallest distance and curve G representing the output for the largest distance. It can be seen that each of the curves A–G has the approximate shape of the light output of a photoflash tube. It is desired to maintain the total amount of light energy received at the location of the photosensitive device at some fixed value regardless of the distance to the subject. That total amount of light corresponds to a fixed area under the curves A–G. For example, consider the area under curve A from $t = o$ to $t = t_A$, as corresponding to the desired total reflected light energy. If at distance A, the flash tube is extinguished at $t_A$, the desired total amount of light will have been received. Then $t_B$ may be defined as the time at which the area under the curve B from $t = 0$ to $t = t_B$ is equal to the area under curve A from $t = 0$ to $t = 0$ $t_A$; $t_C$, $t_D$, $t_E$, $t_F$, and $t_G$ may be correspondingly defined. Times $t_B$ – $t_G$ are the times at which the flash tube must be extinguished for subject distances B–G, respectively.

Further, for subject distance A, the flash should be terminated when the output of amplifier 24 reaches the magnitude of $i_A$ indicated in FIG. 1. Similarly for distances B and C, the flash should be terminated when the amplifier 24 output reaches the magnitudes of $i_B$ and $i_C$, respectively. As to distances D–G, the flash should be terminated when the amplifier 24 output reaches the magnitude of $i_D$ – $i_G$, respectively, for the second time. A curve labeled T is drawn in FIG. 1 connecting the points on curves A–G corresponding to $i_A$ – $i_G$.

Variations in the reflective characteristics of the subject being photographed also result in alterations of the output current of amplifier 24 similar to that shown in FIG. 1 as represented by curves A–G. As will be apparent, the time at which the flash should be terminated for any subject distance or any subject reflectivity is represented by the intersection of curve T with the curve representing the output of amplifier 24.

In the circuit of FIG. 1, programmed current source 28 generates a current which varies as a function of time approximately as shown by curve T in FIG. 1. Comparator 26 compares the currents applied at its two inputs. So long as the current from source 28 exceeds that from amplifier 26, comparator 26 produces at its output a signal which is not operative to activate termination circuit 20. But when the current output of source 24 falls below that of amplifier 24, comparator 24 produces at its output a signal which activates termination circuit 20 and terminates the operation of tube 14. It is evident that in one form of this invention, the current source 28 may produce a current varying with time in a manner which is the negative of curve T of FIG. 1, shown as −T in the lower half of FIG. 1. The comparator 26 could then be a simple summing circuit which produces a signal to activate termination circuit 20 when the sum of the two inputs applied to it is a positive value.

It will be apparent that by proper control of the output of the programmed current source 28, the control circuit may be used to achieve many desirable results. For example, it is well known that the amount of light emitted by a photoflash tube after its operation has been terminated varies with the magnitude of the light being emitted at the time of termination. The difficulties thus created are discussed in the aforementioned U.S. Pat. No. 3,519,879. The control circuit of FIG. 1 may be made to compensate for the post-termination light by advancing the time of operation of termination circuit 14 by a period proportional to the magnitude of the reflected light incident on photosensitive device 22. With reference to FIG. 1, the output of programmed current source 28 is altered from that represented by curve T to that represented by curve T'. It will also be apparent that by proper selection of the shape of curve T and the output of programmed current source 28 in the manner above described, the circuit of FIG. 1 will compensate for various nonlinearities which may exist in the relationship between the current produced by photosensitive device 22 and the light falling upon it.

Figure 3:
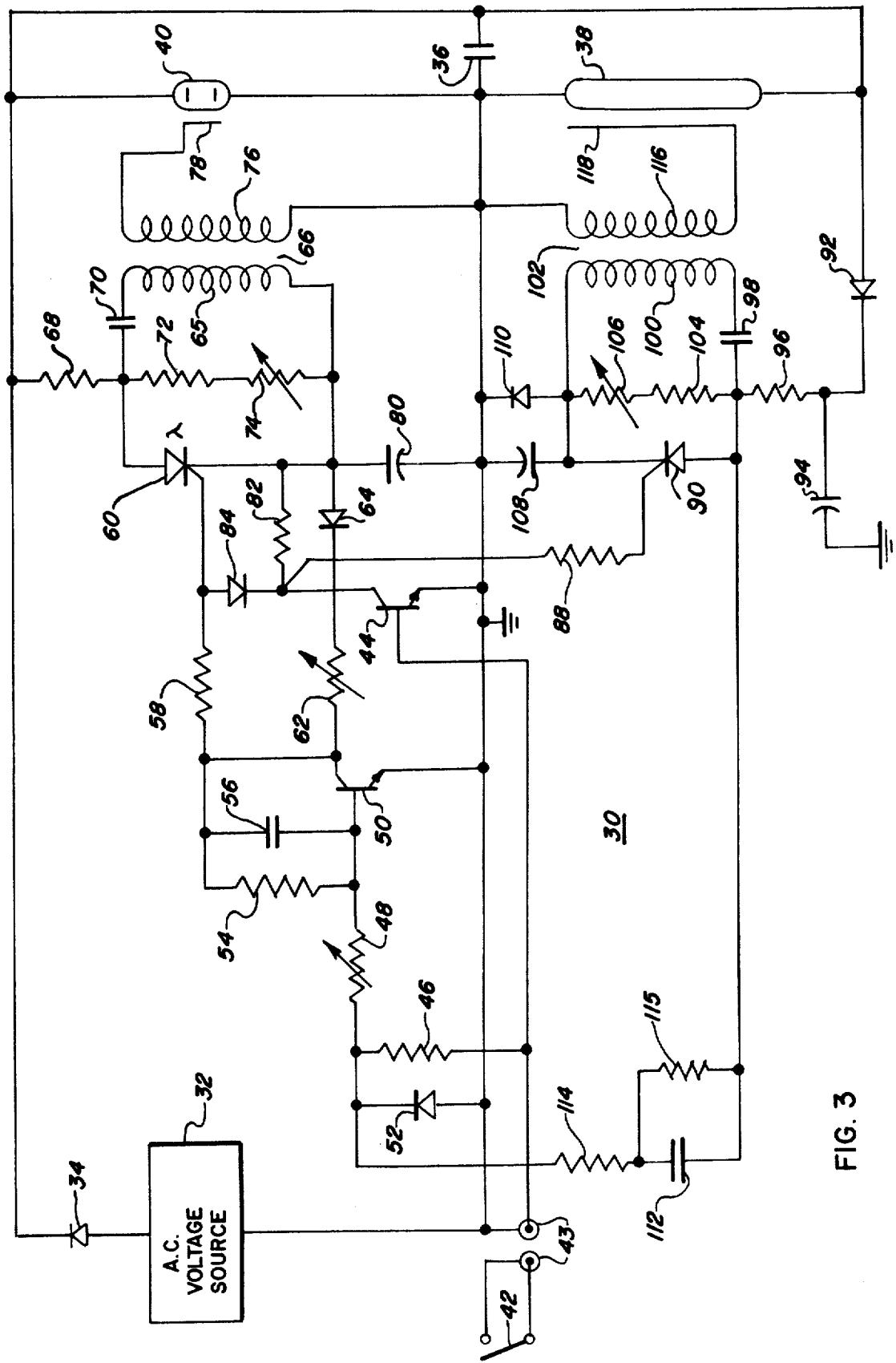
FIG. 3 is a schematic diagram disclosing a photoflash control circuit of this invention.

There is disclosed in FIG. 3 a photoflash circuit 30 including a control circuit of this invention. It includes a conventional voltage source 32 producing across the terminals thereof a relatively high voltage a.c. signal. A first terminal of source 32 is coupled through a diode 34 poled for high positive current conductivity away from the source to one plate of a high voltage capacitor 36. The second terminal of source 32 and the other plate of capacitor 36 are each coupled to a circuit ground. A photoflash tube 38 and a quench tube 40 are both connected in parallel with capacitor 36.

A switch 42 is provided for commencing the operation of flash tube 38. It is normally associated with the camera with which the circuit 30 is being used and is connected to circuit 30 through a jack 43. A first terminal of switch 42 is connected to ground while a second terminal thereof is coupled both directly to the base of an NPN transistor 44 and through the series combination of a resistor 46 and an adjustable resistor 48 to the base of an NPN transistor 50. A diode 52 is connected between ground and the junction of resistors 46 and 48; it is poled for high positive current conductivity away from ground.

The parallel combination of a resistor 54 and a capacitor 56 is connected between the base and collector of transistor 50. The emitter thereof is connected to circuit ground while the collector is further coupled both through an adjustable resistor 58 to the gate element of a light activated silicon controlled rectifier (LASCR) 60 and through the series combination of an adjustable resistor 62 and a diode 64 to a first terminal of a primary winding 65 of a quench transformer 66. Diode 64 is poled for high positive current conductivity towards the collector of transistor 50. The anode of LASCR 60 is coupled through a resistor 68 to the first plate of capacitor 36, through a capacitor 70 to a second terminal of primary winding 65 and through the series combination of a resistor 72 and a variable resistor 74 to the first terminal of primary winding 65. A first terminal of a secondary winding 76 of transformer 66 is connected to a triggering electrode 78 associated with quench tube 40 and a second terminal of secondary winding 76 is connected to ground. The first terminal of primary winding 65 is coupled to ground through a capacitor 80 and to the cathode of LASCR 60.

The emitter of transistor 44 is connected to ground. The collector of that transistor is coupled through a resistor 82 to the cathode of LASCR 60 and through a diode 84 to the gate of LASCR 60, diode 84 being poled for high positive conductivity away from the gate of LASCR 60. The collector of transistor 44 is also coupled through a resistor 88 to the gate element of a silicon controlled rectifier (SCR) 90. The first plate of capacitor 36 is connected to the anode of a diode 92, the cathode thereof being coupled through a capacitor 94 to ground and through a resistor 96 to the anode of SCR 90. The anode of that SCR is coupled through a capacitor 98 to a first terminal of a primary winding 100 on flash tube triggering transformer 102. A second terminal of primary winding 100 is connected to the cathode of SCR 90. The series combination of a resistor 104 and a variable resistor 106 is connected between the anode of SCR 90 and the second terminal of primary winding 100. The cathode of SCR 90 is coupled through the parallel combination of capacitor 108 and diode 110 to ground, diode 110 being poled for high positive conductivity toward ground. The anode of SCR 90 is also coupled through the series combination of a capacitor 112 and a resistor 114 to the common junction of resistors 46 and 48 and diode 52. A resistor 115 is connected across capacitor 112. A first terminal of a secondary winding 116 of transformer 102 is connected to ground while a second terminal thereof is connected to a triggering electrode 118 associated with flash tube 38.

Prior to the closure of switch 42, source 32 charges capacitor 36 to a relatively high d.c. voltage. Capacitors 94, 98, and 108 are likewise charged. The flow of current to ground through the path of diode 92, resistors 114 and 115, and, in the case of transistor 44, resistor 46 and the base-emitter junction of transistor 44, or, in the case of transistor 50, resistor 48 and the base-emitter junction of transistor 50, causes the collector-emitter circuits of both transistors 44 and 50 to be conductive. Thus, capacitor 70 is charged through the path of resistor 68, primary winding 65, diode 64, and transistor 50 to the voltage appearing across the series combination of resistors 72 and 74. Additionally, capacitor 80 is charged through the resistor 68 to the voltage appearing across the resistor 62. Since the collector of transistor 44 is essentially at ground potential, LASCR 60 and SCR 90 are prevented from firing.

Upon the closure of switch 42, the base of transistor 44 is placed at ground potential making the emitter-collector circuit thereof essentially nonconductive. The voltage at the collector of transistor 44 goes up to approximately the voltage appearing across capacitor 80, causing SCR 90 to fire. Capacitor 98 then rapidly discharges through SCR 90 and primary winding 100 causing current flow in secondary winding 116 and triggering flash tube 38. Conduction of SCR 90 also causes a negative voltage pulse to be applied through the network of capacitor 112 and resistor 114 to the bases of transistors 44 and 50.

Light emitted from flash tube 38 is reflected by the subject being photographed and falls on LASCR 60. The LASCR generates a forward current flowing from the cathode of the LASCR through diode 64, and variable resistors 62 and 58 to the gate element of the LASCR. That forward current tends to fire the LASCR. However, there is also generated a reverse current which flows through the cathode/gate circuit of the LASCR and tends to prevent it from firing. That reverse current flow is essentially from the capacitor 80, through the LASCR cathode/gate circuit and resistor 58 to the collector of transistor 50. There is also a current flow through the parallel circuit from capacitor 80 to the collector of transistor 50 including diode 64 and variable resistor 62.

The RC network of resistors 48 and 54 and capacitor 56 causes transistor 50 to act as an integrator of the ground level pulse which is applied to it when switch 42 is closed. Upon closure of that switch, the potential at the collector of transistor 50 will be at zero volts and will increase with time at a rate determined primarily by the relative values of resistors 48 and 54 and capacitor 58. It will thus be apparent that the reverse current in the cathode/gate circuit of LASCR 60 will be relatively large initially and will decrease with time. When switch 42 is first closed, the potential at the collector of transistor 50 will be approximately zero volts but the potential across capacitor 80 will be approximately that to which the capacitor was charged prior to the closure of switch 42. Thus, the potential difference between capacitor 80 and the collector of transistor 50 will be relatively large, and a relatively large reverse current will flow through resistor 58 and the LASCR cathode/gate circuit. As time passes, the potential at the collector of transistor 50 increases and the charge on capacitor 80 decreases, decreasing the potential difference between capacitor 80 and the collector of transistor 50 and reducing the reverse current flow through the cathode/-gate circuit.

The forward current generated by LASCR 60 and the reverse current generated by capacitor 80, transistor 50, and their associated components are combined in resistor 58 and the LASCR cathode/gate circuit. When those two currents are in the correct relationship, LASCR 60 will fire. A typical LASCR requires approximately 2 microamperes of foward current to fire it. Thus, when the sum of the forward and reverse currents equals a net forward current of 2 microamperes, LASCR 60 will fire. Firing of LASCR 60 results in the discharge of capacitor 70 through LASCR 60 and primary winding 65. A current is thus caused to flow in secondary winding 76, triggering quench tube 40. When the quench tube is fired, capacitor 36 rapidly discharges to a value below that required to maintain flash tube 38 ignited, terminating the operation of the flash tube.

As will be apparent from a comparison of FIGS. 1 and 3 hereof, LASCR 60 in the FIG. 3 embodiment performs the function of photosensitive device 22. Further, the current generated by the LASCR and the programmed current are compared in the circuit including the LASCR cathode/gate circuit. The LASCR anode/cathode circuit is used as part of the circuitry for firing the quench tube 40. No amplifier is required to amplify the current generated by the LASCR in response to the light falling thereon.

Variable resistors 48, 58, 62, and 74 provide convenient means for controlling the operation of the circuit of FIG. 3. For example, variable resistor 62 alters the initial potential to which capacitor 80 is charged. Resistors 62 and 58 in combination determine by their combined resistance the magnitude of the forward current generated by LASCR 60 in response to light incident thereon. The manner in which the total resistance of resistors 58 and 62 is distributed between them alters the magnitude of the reverse current applied to the cathode/gate circuit of LASCR 60. Adjustment of resistor 74 can also be used to alter the initial charge placed on capacitor 80 independently of the adjustment of capacitor 62. Alteration of the resistance of resistor 48 varies the rate at which the potential at the collector of transistor 50 will increase following the closure of switch 42. Therefore, the circuit of FIG. 3 is made very flexible. By use of the variable resistors shown, it can be used with flash tubes having many different characteristics of the brightness of the emitted light versus time. Variable resistor 106 provides means for altering the voltage which must be applied to the gate of SCR 90 to cause it to fire. In any single circuit of the form shown in FIG. 3 intended to be used with a single flash tube, it may be desired to make variable resistors 48, 58, 62, 74, and 106 fixed elements. However, in such a circuit it may also be desired to leave element 58 variable as it is particularly convenient for adjusting the circuit to operate with different speed films or different diaphragm openings of the associated camera.

It should be noted that in the circuit of FIG. 3, the maximum voltage which appears acrosss switch 42 is the foward bias voltage of the base/emitter junction of transistor 44. This voltage is sufficiently low as to present no electrical shock hazard.

Figure 4:
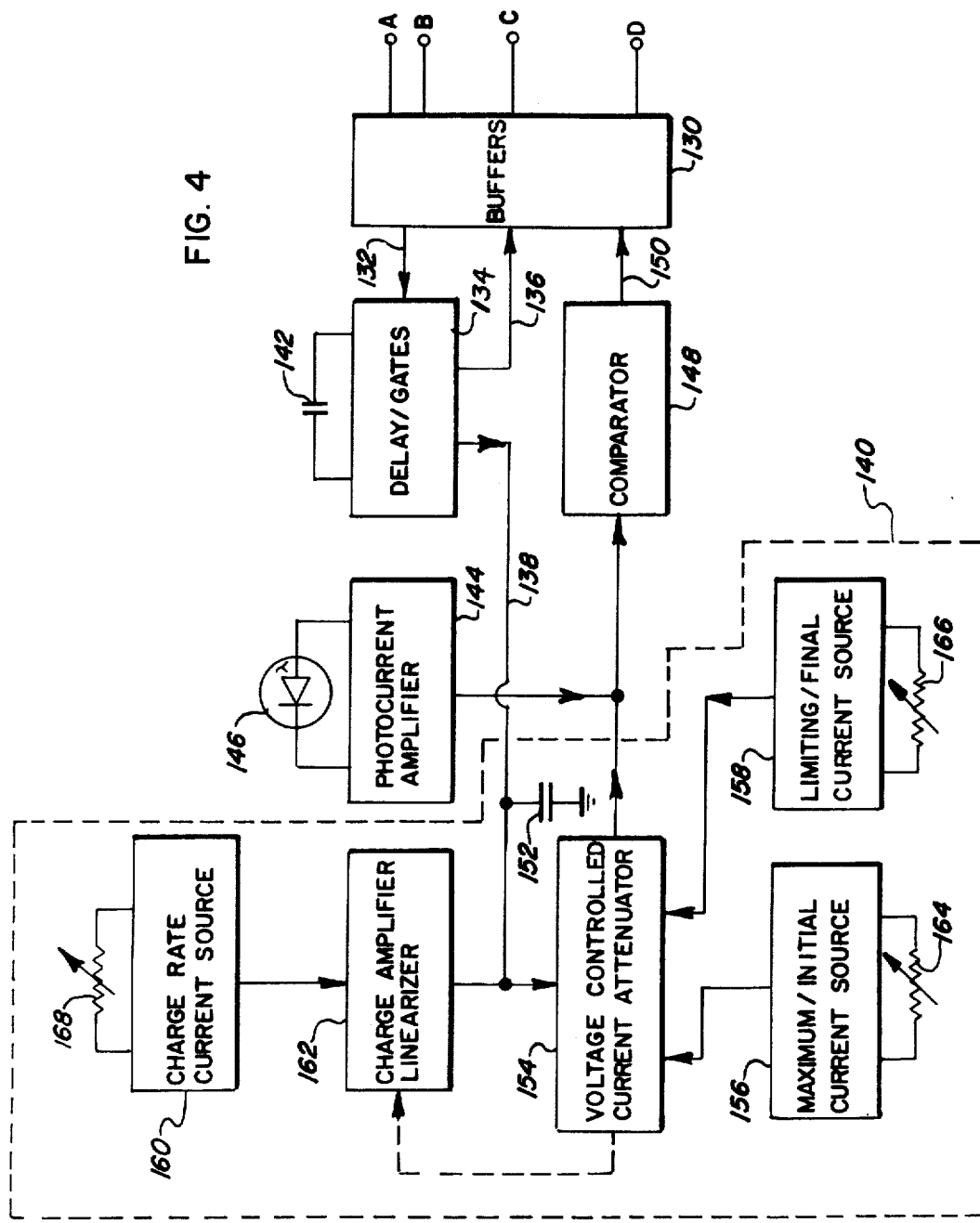
FIG. 4 is a block diagram disclosing a photoflash control circuit of this invention particularly well adapted to being constructed as an integrated circuit.

There is disclosed in FIG. 4 in block diagram form a further embodiment of this invention which is particularly well suited for construction in integrated circuit form. There are provided two circuit points A and B coupled to a buffer stage 130. A completion of a connection between points A and B, as by a simple switch, causes a signal to appear on line 132 which is applied to a delay/gate stage 134. Delay/gate stage 134 provides two outputs in response to the signal on line 132, the first is on line 136 which is applied through buffer stage 136 and generates a signal at circuit point C to trigger the photoflash tube, not shown, and the second is on a line 138 and is applied to a programmed current source 140 to commence the operation thereof. The delay/gate stage 134 either advances or delays the signal on line 136 relative to the signal on line 138, whichever is appropriate in the particular application of the circuit. The delay time is selected in accord with both the current versus time characteristic of the output of programmed current source 140 and the time delay between the generation of the signal at circuit point C required to trigger the photoflash tube and the commencement of light emission from the tube. The magnitude of the delay is determined by the value selected for an external capacitor 142 associated with the delay/gate stage.

The circuit of FIG. 4 also includes an amplifier 144 for amplifying the current generated by a photosensitive device 146. The photosensitive device here is a photodiode. The output of amplifier 144 is applied to the input of a comparator circuit 148. An output of programmed current source 140 is also applied to the input of comparator 148. The comparator compares the currents applied at its input and, when they are in the proper relationship, applies a signal on line 150 to buffer stage 130 which, in turn, creates a signal at circuit point D connected thereto which is operative to terminate the operation of the photoflash tube by external circuitry not shown.

Programmed current source 140 in FIG. 4 is similar to the programmed current source 28 of FIG. 1 in that it generates a current varying as a predetermined function of time and independently of the light received by photosensitive device 146. It includes a capacitor 152 coupled between line 138 and a circuit ground. Line 138 is also coupled to a control input of a voltage controlled current attenuator 154. The attenuator 154 includes two other inputs to which a first current source 156 and a second current source 158 are connected, respectively. The output of the attenuator 154 is used as the output of the programmed current source 140. There is also included within the programmed current source 140 a further current source 160, the output of which is coupled through an amplifier 162 to the control input of the attenuator 154. Each of current sources 156, 158, and 160 are constant current sources but the magnitude of the output currents thereof may be altered by adjustment of variable resistors 164, 166, and 168, respectively associated therewith.

The voltage controlled current attenuator is operative to develop at its output a current which varies in magnitude between the magnitudes of the currents applied to its two inputs from current sources 156 and 158 according to the magnitude of the voltage present at the control input from amplifier 168. Prior to the completion of the connection between circuit points A and B, the voltage across capacitor 152 appearing at the control input of the attenuator 154 is held at a fixed value, and the output of the attenuator is determined primarily by the current supplied by current source 156. After the completion of the connection between circuit points A and B, the voltage across capacitor 152 is permitted to change by the current applied to it from the current source 160 through amplifier 164. As a result the output of the attenuator varies in approximately the manner shown in FIG. 1. As the voltage across capacitor 152 reaches its maximum value, the output of the current attenuator decreases to a magnitude determined by the current supplied by current source 158. A feedback connection between attenuator 154 and amplifier 162, shown as a dashed line in FIG. 3, is provided to make the change in voltage on capacitor 152 more linear with time.

The values of elements 142, 164, 166, and 168 may be altered so that the current of FIG. 4 may be used with flash tubes having many different characteristics of the brightness of the emitted light versus time. In some applications of the circuit of FIG. 4 it may be desirable to make one or more of elements 164, 166, or 168 manually variable for adjusting the circuit to operate with different speed films or different diaphragm openings of the associated camera.

It will thus be seen that photoflash source control circuits have been provided which fulfill the above-mentioned objects. It will be obvious that many modifications of the specific embodiments shown may be made without departing from the spirit and scope of this invention. For example, a variety of different photosensitive devices might be used to sense the light received from the subject. A great number of different circuits might be provided for generating the programmed current. In particular, the programmed current may be generated by either the controlled charge or discharge of a capacitor, or it may be generated by the combination of the controlled charge or discharge of two or more capacitors. Further, a programmed voltage source may be used in place of a programmed current source. The circuitry for combining the output of the light sensitive device and the programmed signal source is subject to wide variation, as are the circuits for initiating and terminating the operation of the photoflash tube. For example, it may be desirable in some applications of this invention to use a current control element in series with the flash tube to interrupt the flow of current to the tube when it is desired to terminate the flash.

While several particular embodiments of this invention have been disclosed herein, it will be understood, of course, that the invention is not to be limited thereto, since many modifications may be made, and it is contemplated, therefore, by the appended claims, to cover any such modifications as fall within the true spirit and scope of this invention.

I claim:

1. Apparatus for controlling the operation of a light emitting flash source and comprising:
flash source initiating means for initiating the operation of said flash source;
light sensitive means for generating a first electrical signal responsive to the light generated by said flash source;
programmed signal generating means for generating a second electrical signal having a magnitude varying as a function of time and independent of the light generated by said flash source; and
flash source terminating means for terminating the operation of said flash source in response to said first and second electrical signals.

2. Apparatus for controlling the operation of a light emitting flash source and comprising:
flash source initiating means for initiating the operation of said flash source;
light activated silicon controlled rectifier means arranged to receive light generated by said flash source;
signal generating means for generating an electrical signal having a magnitude varying as a function of time and independent of the light generated by said flash source to the gate element of said light activated silicon controlled rectifier means; and
flash source terminating means for terminating the operation of said flash source in response to the conduction of said light activated silicon controlled rectifier means.

3. Apparatus for controlling the operation of a light emitting flash source and comprising:
flash source initiating means for initiating the operation of said flash source;
light sensitive means for generating a first electrical signal having a parameter responsive to the light generated by said flash source;
programmed signal generating means for generating a second electrical signal having a parameter varying as a function of time and independent of the light generated by said flash source;
electrical signal combining means for combining said first and second electrical signals to produce a terminating signal; and
flash source terminating means for terminating the operation of said flash source in response to said terminating signal.

4. Apparatus for controlling the operation of a light emitting photoflash source and comprising:
flash source initiating means for initiating the operation of said photoflash source;
light sensitive means for generating a first electrical signal having a parameter responsive to the light received from a subject to be photographed;
programmed signal generating means for generating a second electrical signal having a parameter varying as a function of time and independent of the light received from said subject by said light sensitive means while said source is emitting light; and
flash source terminating means for terminating the operation of said flash source in response to said first and second electrical signals.

5. Apparatus for controlling the operation of a light emitting photoflash source and comprising:
photoflash source initiating means for initiating the operation of said photoflash source;
circuit means comprising a photosensitive device disposed to receive light from a subject being photographed, said circuit means producing a first electrical signal having a parameter related to the light received from said subject;
programmed signal generating means for producing a second electrical signal having a parameter which varies as a function of time and independent of the light from said subject received by said light sensitive device while said source is emitting light; and photoflash source terminating means for terminating the operation of said flash source in response to said first and second electrical signals.

6. Apparatus for controlling the operation of a light emitting photoflash source and comprising:
flash source initiating means for initiating the operation of said photoflash source;
light sensitive means for generating a first electrical signal responsive to the light received from a subject to be photographed;
programmed signal generating means for generating a second electrical signal having a parameter varying as a function of time and independent of the light received from said subject by said light sensitive means;
electrical signal combining means for combining said first and second electrical signals to produce a terminating signal; and
flash source terminating means for terminating the operation of said flash source in response to said terminating signal.

7. Photoflash apparatus for use with an associated camera and comprising:
a photoflash tube for producing a flash of light;
firing means coupled to said tube for causing said tube to commence the emission of light;
circuit means comprising a photosensitive device disposed to receive light from a subject being photographed, said circuit means producing a first electrical signal having a parameter related to the light received from said subject;
programmed signal generating means for producing a second electrical signal having a parameter which varies as a function of time and independent of the light from said subject received by said light sensitive device while said tube is emitting light; and
flash source terminating means for terminating the operation of said flash source in response to said first and second electrical signals.

* * * * *